July 15, 1952 E. G. COOK 2,603,720

HIGH-LEVEL RECORDING SYSTEM

Filed Feb. 26, 1948 4 Sheets-Sheet 1

INVENTOR
EMORY G. COOK
BY Joseph V. Meigs
ATTORNEY

July 15, 1952 E. G. COOK 2,603,720

HIGH-LEVEL RECORDING SYSTEM

Filed Feb. 26, 1948 4 Sheets-Sheet 2

INVENTOR
EMORY G. COOK
BY Joseph V. Meigs
ATTORNEY

INVENTOR
EMORY G. COOK
BY Joseph V. Meigs
ATTORNEY

July 15, 1952 — E. G. COOK — 2,603,720

HIGH-LEVEL RECORDING SYSTEM

Filed Feb. 26, 1948 — 4 Sheets-Sheet 4

Inventor
EMORY G. COOK

Joseph V. Meigs
Attorney

Patented July 15, 1952 2,603,720

UNITED STATES PATENT OFFICE 2,603,720

HIGH-LEVEL RECORDING SYSTEM

Emory G. Cook, Floral Park, N. Y.

Application February 26, 1948, Serial No. 11,242

5 Claims. (Cl. 179—100.1)

This invention relates to the recording of sound. More particularly, it relates to methods and apparatus for producing improved phonograph records, especially of music.

When sound is recorded for the purpose of making phonograph records a continuous spiral groove is formed on the surface of the record and is modulated (caused to change direction) in accordance with the recorded sound signals. In other words, the groove deviates laterally from a true spiral so that it traces a path corresponding in shape to the waveform of the sound signals.

If these excursions or deviations of the groove, from the normal direction which the groove would have if it were not modulated, are not sufficiently large, the random noise effects, for example, as evidenced by needle scratch, which are an inherent part of any recording or reproducing system, are large enough compared with the amplitude of the sound signals which can be reproduced from the record, that the sound may be of poor quality. As the average amplitude of the deviations is increased, the sound or volume level on the record increases and the quality and utility of the recording increases correspondingly.

However, the amount by which the amplitude or sound level on the record may be increased is limited by several factors. For example, the maximum swing of the stylus which cuts the record must be less than one-half the distance between the centers of adjacent grooves, so that a dividing wall remains between the grooves to guide the reproducing stylus and prevent it from jumping from one groove to another. Furthermore, these walls must have sufficient horizontal thickness to withstand the lateral forces exerted by the reproducing stylus so that the walls will not break or chip during repeated playing of the record.

It is possible to increase the average amplitude of the groove by the use of a limiter circuit, which automatically reduces amplitudes of all of the frequency components of the signal whenever the maximum amplitude of the signal being recorded exceeds a predetermined level. The operating level of this limiter is adjusted so that a suitable dividing wall is insured between adjacent grooves.

However, the characteristics of conventional recording systems are such that low frequency signals are recorded at higher relative amplitudes than higher frequency signals and, in accordance with one aspect of the present invention, excursions of the recording stylus of excessive magnitude are prevented by limiting only the amplitude of the low frequency components of the signal to a predetermined value. In this manner the selective limiting action is effective only on the low frequency components of the signal, and other frequency components are recorded at full volume level.

Accordingly, it is an object of this invention to provide a system of recording wherein the low frequency components of the sound signal are limited selectively to a predetermined maximum amplitude.

Another limitation upon the level of sound which may be recorded is set by the "angle of deviation" of the groove, defined for the purpose of this description as the angle between the actual direction of the modulated groove in its lateral excursions and the direction which the groove would have, if it were unmodulated, that is, if no sound signals were recorded.

When sound is being reproduced from a phonograph record, the record is rotated, usually at constant angular speed, by a motor or other drive means, while the stylus of the reproducing head merely rests upon the surface of the record. As the record rotates, the stylus of the recorder head moves laterally in accordance with the deviations of the groove as it traces the spiral from the outside to the center of the record. Thus, it is the rotational force of the record which is translated, by the groove deviations, into the lateral forces on the reproducing stylus. As the angle of deviation of the record groove increases, the forward component of the force exerted by the surface of the record upon the reproducing stylus increases. At some critical value, this force becomes so large that the stylus will no longer follow the groove and will either chip the record or be forced out of the record groove. In practice, if the angle of deviation of the groove is greater than 30 to 45 degrees, the reproducing stylus will be unable to follow the sound groove.

Assume (however, only for the purpose of explanation) that a groove is modulated in accordance with a square wave as indicated schematically in Fig. 1. The direction which the groove would have if it were not modulated is shown by the line G—G. The modulated groove follows the contour indicated by the broken line 2. The maximum angle of deviation $\theta$ between the modulated groove and the path which the groove would have if it were unmodulated is 90 degrees. It is apparent that a conventional reproducing stylus will not follow the square waveform of the modulated groove 2 but will be forced out of the groove or else will chip the groove walls. This would be true even though the square waveform of the groove 2 were a faithful reproduction of the electrical signals which were applied to the recording equipment. It follows, therefore, that a recording system which produces a sound groove corresponding most faithfully to the original sound signals, does not result necessarily, when considered in combination with the reproducing equipment, in the most desirable over-all system.

In a recording system the record blank is rotated in the same manner as in reproducing equipment, but the power which produces the lateral modulation movement of the stylus is provided by forces applied directly to the stylus and, although it is not possible with conventional recording equipment for the stylus to cut a groove having an angle of deviation as high as ninety degrees, it is easily possible to cut a groove having such a high angle of deviation that the reproducing stylus will be unable to follow it.

The elimination of high angle deviations, in accordance with this aspect of the invention, enables the reproducing stylus to follow faithfully the contour of the sound groove, thereby eliminating one source of distortion and decreasing the likelihood of chipping or wearing away of the walls which divide adjacent sound grooves.

As the frequency of the recorded signal is increased (with, for example, the amplitude of the signal and the linear speed of the groove remaining constant) the angle of deviation of the groove increases. Thus, it is the high frequency components of the recorded signals which produce the greatest angles of deviation of the groove.

With a given frequency, the lateral velocity of the cutting stylus, and, therefore, the angle of deviation of the groove, depends upon the amplitude of the signal being recorded. This may be seen more clearly by examining the modulated grooves represented in Fig. 2, where line G—G again represents the direction of an unmodulated groove. A groove modulated with a triangular waveform, with the height A, follows the path indicated by the broken line 4, and the angle of deviation is indicated at $\varphi$. If, however, the amplitude of this triangular waveform is increased from A to B, the frequency of the recording signal and the linear groove speed of the record remaining constant, the groove will follow the path indicated by the solid line 6. It is observed readily that the lateral velocity of the recording stylus must have been increased in order to cut the latter groove, and that the resulting angle of deviation has increased accordingly, as indicated by angle $\alpha$. Thus, the angle of deviation may be controlled by limiting selectively the high frequency components of the signal while permitting other frequency components to be recorded at full volume level.

Accordingly, it is a further object of this invention to provide a system for the high level recording of sound wherein the high frequency components of the signals are limited selectively, so that the maximum angle of deviation of the record groove does not exceed a predetermined value.

The angle of deviation of the record groove is a function also of the linear speed of the record groove at the point of contact with the stylus. In conventional sound recording and reproducing systems, the rotational speed of the record is held constant with the result that the linear groove speed is higher at the outer portions of the record and decreases steadily toward the center of the record. The effect of this changing groove speed may be seen clearly by consideration of Fig. 3, in which the direction of the unmodulated groove is indicated again by line G—G. If a triangular waveform of a given frequency is recorded near the outer edge of the record where the linear speed of the groove is highest, the lateral movement of the recording stylus will cause a groove 8, having an angle of deviation, $\psi$, to be recorded on the record surface. If, however, an identical signal is recorded near the center of the record, say at a point where the linear groove speed has decreased to one-half its former value, the lateral movements of the recording stylus remain the same, but the groove formed by the stylus in the surface of the record follows the contour indicated by the broken line 12, having an angle of deviation $\beta$, which is greater than angle $\psi$, even though the frequency of the recorded signal has remained constant. Thus, in accordance with still another aspect of the present invention, further increase in the volume level of the recorded sound is obtained by controlling the selective limitation of the high frequency components in accordance with the linear speed of the record surface at the point of contact with the stylus.

Accordingly, it is a further object of this invention to provide a system for the recording of sound signals wherein the amplitude of the high frequency components of the signal to be recorded are limited selectively with the level of limiting action controlled in accordance with the linear groove speed of the record at the point of contact of the stylus.

By combining both of the selective limiting actions, that is, by limiting both the high and low frequencies selectively, the volume level which it is possible to place on the record is increased by a surprisingly large amount. Actual records produced in accordance with the principles of the present invention carried a level of sound volume as much as 12 decibels above records produced with conventional sound recording apparatus. In other words, these new records contain some 32 times as much sound energy and produce a sound many times higher in volume from the loudspeaker of the playback equipment.

Thus, it is another object of this invention to provide methods and apparatus for recording sound signals at a high volume level wherein the high frequency and low frequency components of the sound signals are momentarily limited as necessary selectively in amplitude.

With such recording, the noise level, which may be noted upon reproduction as a background crackling or hiss, is reduced appreciably because of the lower amplification which is required in the reproducing equipment. As a result of this lower requirement in the way of amplification, a corresponding improvement in the quality of reproduction may be achieved readily.

When two signals of different frequencies, particularly a low frequency and a high frequency, are passed simultaneously through a nonlinear device, for example, an amplifier tube operating outside its linear range, new frequencies are produced in addition to those already present. If such action occurs in either the recording or reproducing equipment, the sound waves radiated by the loudspeaker will contain frequencies that were not present in the original sounds. This is known as intermodulation distortion and occurs most noticeably, in the usual amplifier arrangements, when high amplitude signals are present because there is more likelihood that these signals will cause the amplifier tubes to operate on nonlinear portions of their characteristic curves. In accordance with the present invention the extent of such intermodulation is reduced in both the recording and reproducing equipment.

Thus, a further object of the invention is to provide a recording system in which distortion, occasioned by intermodulation of the high and low frequency components of the sound signals, is reduced.

Another object is to produce novel apparatus components well suited for use in the improved recording system and having wide utility in other fields of application. For example, it is an object of this invention to provide apparatus for producing an impedance to the flow of alternating current, which impedance may be varied linearly over wide ranges by the application of low direct control voltages.

Accordingly, the objects of this invention are directed to methods and apparatus for use in the production of improved sound records and to the process of frequency selective amplitude limitation of sound signals whereby phonograph records may be produced having a higher sound volume level without increasing the necessary groove width.

Other objects and advantages will be in part pointed out and in part apparent from a consideration of the following description taken in conjunction with the accompanying drawings, in which.

The control of the signal which is to be recorded may be accomplished by various arrangements of electronic apparatus and the following examples are given for the purpose of illustrating the best embodiment now known, but are not intended to be limiting of the invention.

Figure 3:
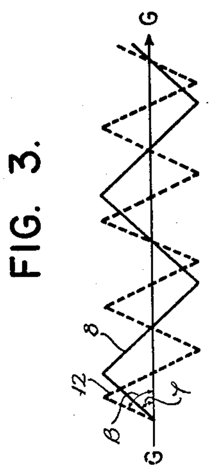
Fig. 3 is a diagrammatic representation of the paths of two grooves illustrating the effect of linear groove speed on the angle of deviation of the modulated groove.
Figure 2:
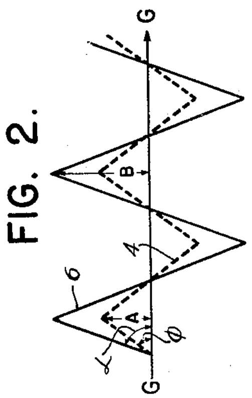
Fig. 2 is a diagrammatic representation of the paths of two grooves and illustrates the effect of amplitude of sound signals on the angle of deviation of the record groove.
Figure 1:
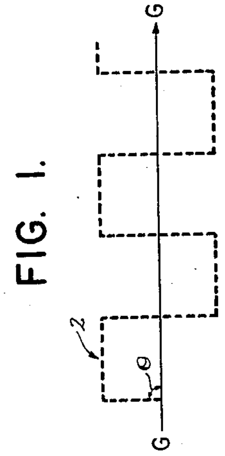
Fig. 1 shows a groove modulated with a square wave and illustrates the importance of the angle of deviation of the groove in the process of reproducing recorded sound signals.
Figures 4, 5:
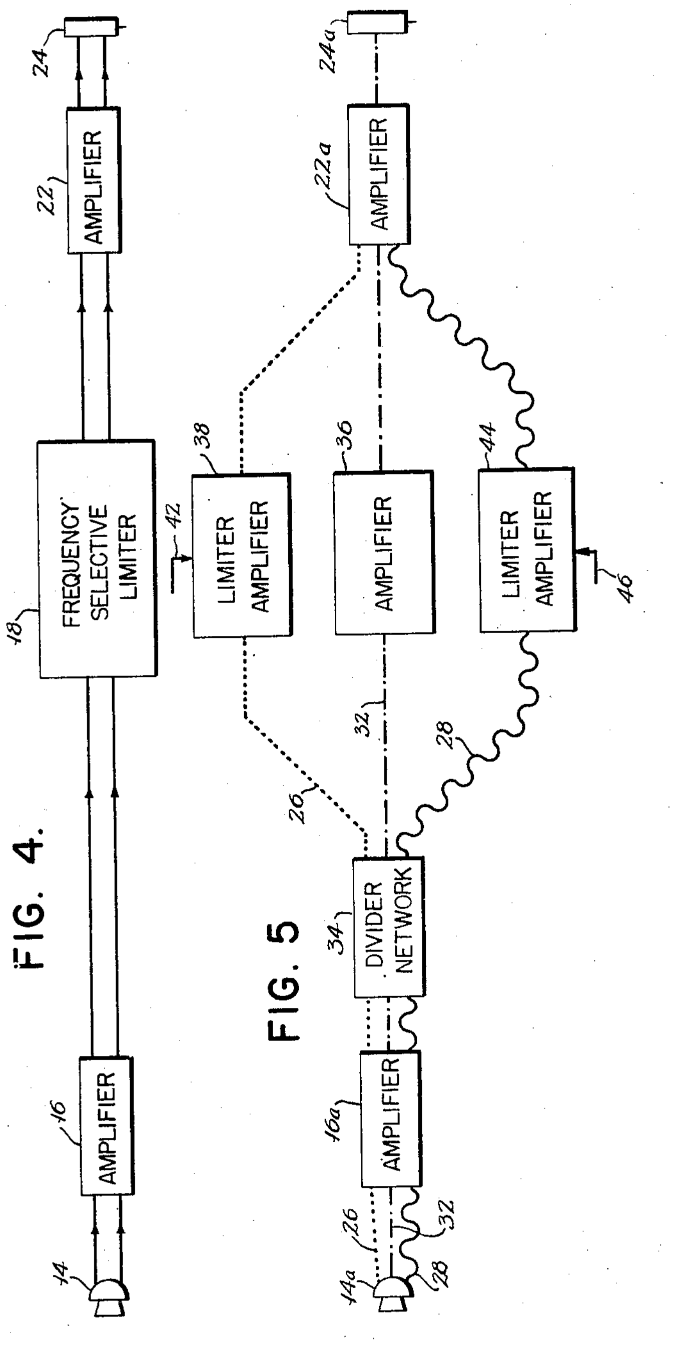
Fig. 4 is a block diagram illustrating a recording system utilizing selective limitation of the sound signals.
Fig. 5 is a block diagram illustrating a recording system incorporating separate selective limitation of the high and low frequencies.

The block diagram of Fig. 4 indicates, broadly, one way of limiting the high or low frequency components of the signal. The electrical signals, which correspond in waveform to the sound signals which are to be recorded, are delivered by a microphone 14 to a conventional audio amplifier 16 which may include various mixing and auxiliary control circuits such as are employed in the usual recording system. The output of amplifier 16 is coupled to a frequency selective limiter 18. The limiter 18 may be one designed to limit only the amplitude of the high frequencies to avoid excessive angles of deviation, or it may be one adapted to limit only the low frequencies in order to prevent excessive excursions of the record groove from its normal path. In either case, the medium frequencies, that is, those frequency components in the middle range between the high and low frequencies, are permitted to pass through this portion of the recording equipment without any limiting action. The output signals from the limiter 18 are applied to a conventional amplifier 22, the output of which is coupled to a recorder head 24.

In order to limit both the high and low frequency components selectively, an arrangement may be employed such as is shown in block diagram form in Fig. 5. The sound signals which are to be recorded are translated by a microphone 14A into electrical signals. For convenience, the paths of the high, low, and medium frequency components of these electrical signals are represented respectively, by a dotted line 26, a wavy line 28, and a dot-dash line 32. These signals are amplified by amplifier 16A in the usual manner and applied to a dividing network 34 which separates the composite signal into the three components, that is, high, low, and medium frequencies, as indicated by the separation of lines 26, 28, and 32 from the dividing network 34.

The frequencies lying in the middle frequency range are amplified by a conventional amplifier circuit 36 in which no limiting action occurs.

The high frequency components represented by line 26 are applied to a limiter-amplifier 38, where these frequencies are amplified and limited, that is, prevented from exceeding a predetermined amplitude. In other words, limiter-amplifier 38 is arranged so that as the high frequency signals approach a predetermined amplitude, the gain of amplitude 38 is reduced automatically to prevent the signals which are delivered by limiter-amplifier 38 from exceeding, at any time, this predetermined value. Such a limiter-amplifier may be controlled by a suitable control voltage applied to a lead 42, so that the predetermined voltage at which the limiting action occurs may be varied in accordance with other parameters. Thus, as pointed out above, the level at which the limiting action takes place may be controlled, in accordance with the linear velocity of the record at the point of contact with the stylus, by applying to lead 42 a control voltage which is a function of the lateral position of the recording head 24A on the record.

The low frequency components, indicated by wavy line 28, are applied to another limiter-amplifier 44, the operating level of which may be controlled by a voltage applied to lead 46.

The limiters 42 and 46 and amplifier 36 are arranged so that the signals delivered by the respective equipments are in proper phase relationship, so that they may be recombined in amplifier 22A and subsequently applied to the recording head 24A.

*Circuit details*

Figure 6:
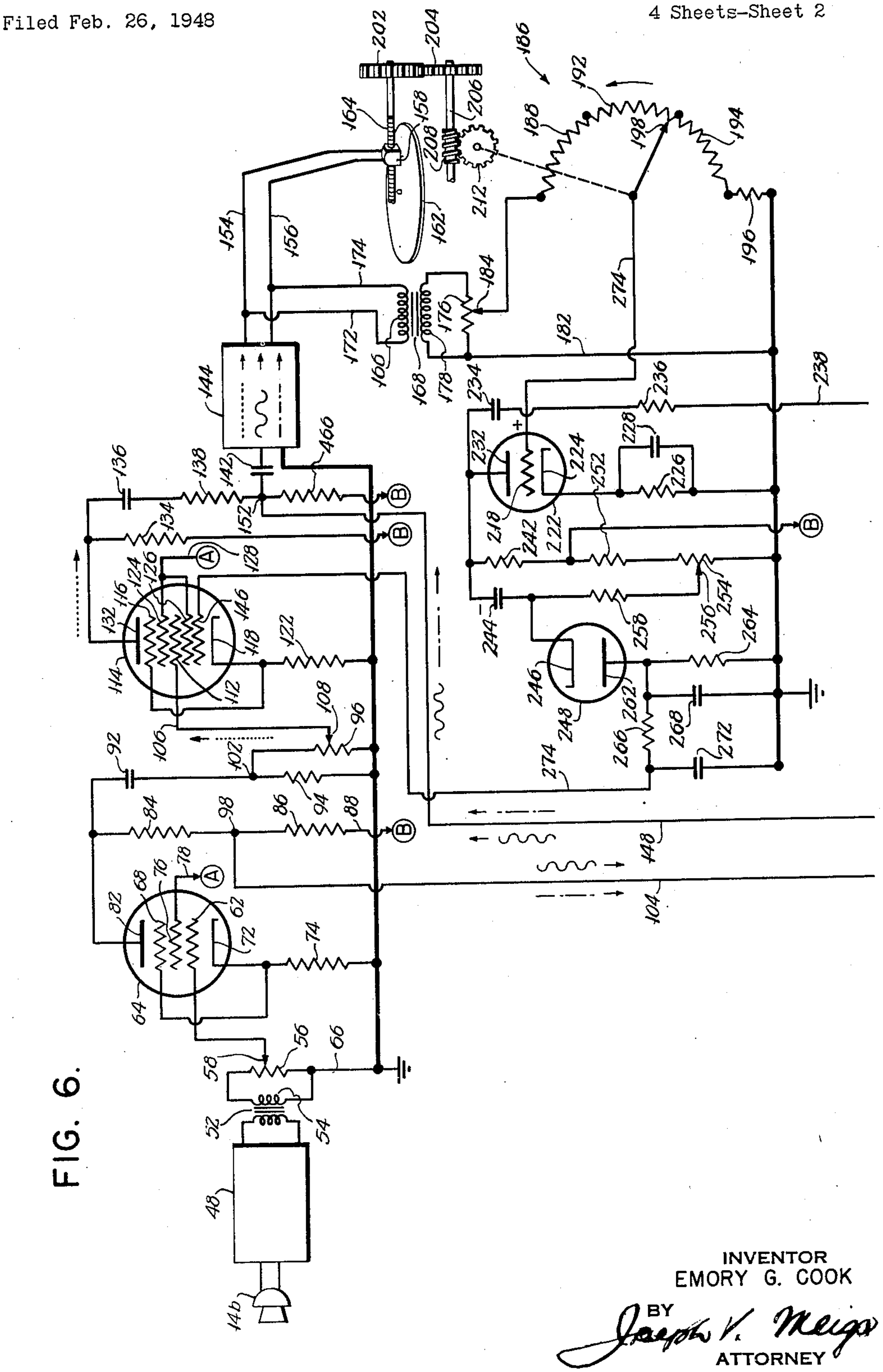
Figs. 6 and 6A show a detailed circuit diagram of a recording system control constructed in accordance with the present invention.
Figure 6A:
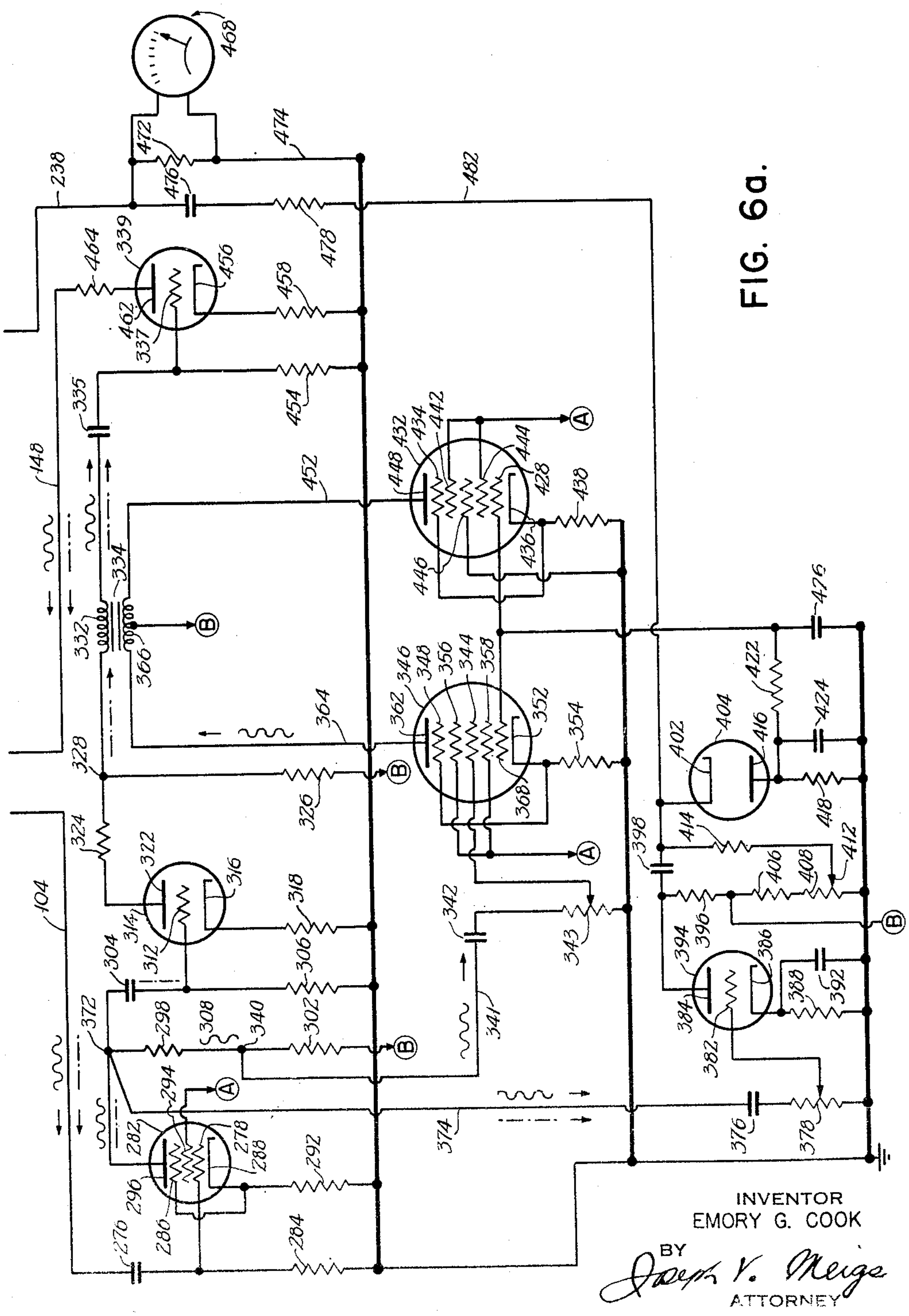

Figs. 6 and 6A together illustrate the details of one form of apparatus for recording sound signals in accordance with the present invention. The electrical signals corresponding to the sound signals which are to be recorded are delivered by a microphone 14B to a preamplifier, indicated in block form at 48. The output signals from the amplifier 48 are coupled by means of a transformer 52 which has a secondary winding 54 to a potentiometer 56, the variable tap 58 of which is connected to a control grid 62 of a pentode vacuum tube 64. One end of the potentiometer 56 is connected to ground by means of a lead 66 so that the level of signal applied to control grid 62 may be varied by adjustment of the potentiometer 56.

*Separation of high frequency components*

The suppressor grid 68 of tube 64 is connected to cathode 72 which is connected to ground through a bias resistor 74 in the conventional manner. Voltage is provided for screen grid 76 through a lead 78 which is connected to a suitably regulated power source A (not shown). Anode voltage for tube 64 is supplied to anode 82 through load resistors 84 and 86 from a lead 88 which is connected to a suitably regulated power source B (not shown). A condenser 92 and a series resistor 94 are connected between anode 82 and ground. A potentiometer 96, which desirably has a resistance value that is high relative to the value of resistor 94, is connected in shunt with resistor 94. Resistors 86 and 94 preferably have substantially equal values.

This arrangement provides a simple dividing network which separates the high frequency components from the low and middle frequency components. The alternating current load impedance in this circuit is small as compared with the very high plate resistance of the tube 64 and the tube, thus, may be considered to act as a constant current generator, which with a given signal voltage applied to control grid 62 will cause the same amount of current, irrespective of frequency, to flow through the plate loading network. The condenser 92 has a relatively low reactance compared to the resistance of resistor 84 at the higher frequencies, and a larger reactance as the frequency is decreased. The values of resistors 86 and 94 are low, relative to the value of resistance 84. The signal current from anode 82 will divide, thus, with the higher frequency components passing through condenser 92 and resistance 94 to ground and the low and medium frequency components passing through resistors 84 and 86. The output signal voltage at point 98, that is, the voltage developed across resistor 86, will comprise the low and medium frequencies and will be complementary to the high frequency voltage developed at point 102, that is, the voltage developed across resistor 94. In other words, with a given signal voltage applied to grid 62, the sum of the voltages at points 98 and 102 will remain constant, regardless of frequency.

The low and medium frequency components indicated, respectively, by the wavy and dot-dash lines adjacent lead 104, are connected to the circuits shown in Fig. 6A, which will be described later.

*High frequency limiter-amplifier*

The high frequency components, represented by the dotted line adjacent lead 106, are applied, from an adjustable tap 108 of potentiometer 96, to control grid 112 of a limiter-amplifier tube 114. The suppressor grid 116 of this tube is connected to the cathode 118 which is in turn connected to ground through a bias resistor 122. Grids 124 and 126 of tube 114 are connected by lead 128 to power source A. The anode 132 of this tube is connected through a load resistance 134 to power source B. The signal voltage which is developed across load resistor 134 is coupled through a condenser 136, an isolating resistor 138, and a condenser 142 to an amplifier, indicated in block form at 144.

The amplification of limiter tube 114 is a function of the bias or control voltage which is applied to control grid 146 of that tube. This control voltage limits the amplitude of the high frequency components and is arranged to control this action in accordance with the high frequency amplitude of the composite signal and with the linear groove speed of the record at the point of contact with the stylus, as described below.

The low and medium frequency components are returned from the equipment represented by Fig. 6A, by a lead 148, to point 152 where they are recombined with the high frequency components from limiter-amplifier 114 and applied to the amplifier 144.

The output signal from amplifier 144 is applied through leads 154 and 156 to a magnetic recorder head 158 which is moved laterally across turntable 162 by rotation of a feed screw 164.

*Control circuits for high frequency limiter-amplifier*

The instantaneous velocity of the stylus will be proportional to the signal voltage on leads 154 and 156. Accordingly, the instantaneous amplitude of this signal voltage is a measure of the angle of deviation of the record groove. This voltage is utilized to control the limiting action of tube 114.

The primary 166 of a transformer 168 is connected across leads 154 and 156 by leads 172 and 174. A potentiometer 176 is connected across secondary winding 178 of transformer 168 and one terminal thereof is connected to ground by means of a lead 182. The variable tap 184 of potentiometer 176 is connected to ground through a potentiometer generally indicated at 186. This potentiometer may comprise a continually variable resistance potentiometer, which is provided with a tapered characteristic either by mechanical or electrical means, or it may comprise separate resistors, for example, resistors 188, 192, 194, and 196, with rotor arm 198 arranged to switch successively from resistor to resistor. In either case, the position of rotor arm 198 is controlled in accordance with the lateral position of recorder head 158 on turntable 162. This is indicated diagrammatically in Fig. 6, in which feed screw 164 is connected mechanically by gears 202 and 204, shaft 206, worm 208 and gear 212, to rotate rotor arm 198.

The voltage between rotor arm 198 and ground is utilized to control the limiting action of tube 114. This voltage which is directly proportional to the lateral velocity of the cutting stylus, is derived from potentiometer 176 and is attenuated by potentiometer 186 in accordance with the lateral position of recording head 158. Thus, when recording head 158 is at the outermost portion of the record, the limiting action takes place at a higher signal level because of the relatively high linear groove speed of the record and rotor arm 198 is positioned accordingly, in the lower portion of potentiometer 186. As the recorder head 158 moves toward the center of the record, rotor arm 198 progresses in a counterclockwise direction toward resistor 188, thus lowering the signal level at which limiting action takes place as recorder head 158 approaches the center of the record.

Rotor arm 198 is connected by a lead 214 to a grid 218 of a triode tube 222, the cathode 224 of which is connected to ground through a resistor 226 which is shunted by a capacitor 228. The anode 232 of this tube is coupled through a condenser 234 and a resistor 236 to lead 238 which is connected to the circuits shown in Fig. 6A to provide a volume indication as described below.

Anode 232 is connected through plate load resistance 242 to power source B. The signal voltage which is developed across load resistance 242 is coupled through a condenser 244 to a cathode 246 of a diode tube 248. This cathode is biased positively with respect to ground by a voltage divider circuit comprising a resistor 252 and a potentiometer 254 connected between power supply B and ground. The variable tap 256 of potentiometer 254 is connected through an isolating resistance 258 to the cathode 246. Anode 262 of diode 248 is connected through a load resistance 264 to ground. With this arrangement signal current will flow through diode 248 only when the negative amplitude of the signal voltage applied to cathode 246 through condenser 244 exceeds the positive bias applied to the cathode by means of potentiometer 254, the point at which current starts to flow; and accordingly the level at which limiting action takes place is adjusted by varying the position of variable tap 256 of potentiometer 254.

The rectified signal voltage appearing across load resistance 264 is smoothed by a condenser-resistance filter network comprising series resistance 266 and shunt capacitors 268 and 272. This circuit delivers a negative direct potential which is applied by lead 274 to control grid 146 of tube 114.

Thus, negative bias is applied to grid 146 of tube 114 whenever the voltage appearing between leads 154 and 156 exceeds a predetermined value, which value is a function of the velocity of the recording stylus and of the linear groove speed of the record at the point of contact with the stylus. This negative bias on grid 146 reduces the amplification of tube 114, thus lowering the amplitude of the high frequency signals which are applied to amplifier 144.

*Separation of low from medium frequency components*

The medium and low frequency components of the signal which are coupled from point 98 in the plate circuit of tube 64 of Fig. 6 through lead 104 to the circuit diagram shown in Fig. 6A are coupled through a condenser 276 to grid 278 of a pentode tube 282. A D. C. grid return path is provided to ground through a resistance 284. The suppressor grid 286 of this tube is connected to a cathode 288 which is in turn connected to ground through a bias resistor 292. The screen grid 294 is connected to power source A. The anode 296 of this tube is connected to a dividing network similar to that described in connection with tube 64 in Fig. 6, except that in this case the constants are adjusted so that the low and medium frequencies are separated from each other.

The first branch of the dividing network comprises series plate load resistors 298 and 302 which are connected to power source B. The second branch of the network comprises capacitor 304 in series with resistance 306 which is connected to ground as in the first dividing network. The resistance values of resistors 302 and 306 are desirably equal and the reactance of condenser 304 is substantially equal to the value of resistance 298 at the crossover point of the network characteristics.

The medium frequency components are coupled from point 308 between resistor 306 and capacitor 304, to grid 312 of triode tube 314. The cathode 316 of this tube is connected to ground in the conventional manner through a bias resistor 318. The anode 322 of this tube is coupled through series load resistors 324 and 326 to power source B. The output signal is coupled from point 328 between these two resistors, which thus form a voltage divider, through secondary winding 332 of a transformer 334, where the low frequency components are reinserted, and through a coupling condenser 335 to a control grid 337 of a triode vacuum tube 339.

*Low frequency amplifier-limiter*

The low frequency components of the signal are taken from the plate circuit of tube 282 at point 340 and, by lead 341, condenser 342, and potentiometer 343, coupled to grid 344 of an amplifier-limiter tube 346. The suppressor grid 348 of this tube is connected to the cathode 352 which is connected to ground through a bias resistor 354. Grids 356 and 358 of this tube are connected to the power source A. The anode 362 of tube 346 is connected by lead 364 to the primary 366 of transformer 334, the center tap of which is connected to power source B.

The low frequency signals are amplified by tube 346 to an extent depending upon the bias voltage which is applied to control grid 368 of that tube. This voltage is controlled so as to limit the amplitude of the low frequency components of the signal whenever the amplitude of the low and medium frequency components of the signal exceed a predetermined value.

*Control circuit for low frequency amplifier-limiter*

The voltage developed by the low and medium frequencies at point 372 in the plate circuit of tube 282, is applied, through lead 374, coupling condenser 376, and potentiometer 378 to control grid 382 of triode tube 384. The cathode 386 of this tube is connected to ground through bias resistor 388 in parallel with a condenser 392. Anode 394 of tube 384 is connected through a load resistor 396 to power source B, and is coupled also through a condenser 398 to cathode 402 of a biased diode tube 404. This cathode is biased positively with respect to ground by a voltage divider comprising a resistor 406 and a potentiometer 408 connected between power source B and ground. The adjustable tap 412 of this potentiometer is connected through a resistor 414 to the cathode 402. The anode 416 of tube 404 is connected to ground through a load resistor 418.

Thus, current flow is permitted through diode 404 whenever the negative amplitude of the low and medium frequency signal components, developed across load resistor 396 of tube 384, exceeds the value of the positive bias applied to cathode 402 from potentiometer 408. When this occurs a direct voltage is developed across load resistor 418 causing anode 416 to become negative with respect to ground. This direct voltage is filtered by a resistor-condenser network comprising a series resistor 422 and shunt condensers

424 and 426, and applied to control grid 368 of limiter tube 346.

Thus, whenever the amplitude of the medium and low frequency components of the signal exceed the predetermined value which would cause the recording stylus to exceed the limits set by the normal groove separation of the record, a negative voltage is applied to grid 368 of the amplifier-limiter tube 346; thus reducing the amplification of this tube so that the low frequency components, which are combined with the medium frequency components by transformer 334, are limited in amplitude and prevent thereby excessively large excursions of the modulated groove.

In order to prevent transient effects which might otherwise be introduced by application of limiting control voltage to grid 368 of tube 346, this control voltage is applied simultaneously to grid 428 of a tube 432 which has characteristics substantially identical with those of tube 346. Suppressor grid 434 of this tube is connected to cathode 436, which is in turn connected to ground through a bias ressistor 438. Grids 442 and 444, corresponding to grids 356 and 358 in tube 346, are connected to power source A. Control grid 446 of tube 432, which corresponds to control grid 344 in tube 346 to which the low frequency signal voltage is applied, is connected directly to ground. Anode 448 of tube 432 is connected by lead 452 to the opposite end of primary winding 366 from that which is connected to anode 362 of tube 346.

*Recombining of low with medium frequencies*

With this arrangement the low frequency signal components produce a current in the anode circuit of tube 346 which flows through one-half of the primary winding 356 of transformer 334, and thus induces corresponding signal voltages in secondary winding 332. However, the direct limiter control voltage is applied to control grids of tubes 346 and 432. The plate current signals produced thereby flow in opposite directions through their respective halves of the primary winding 366 and thus cancel, so that no voltage is induced thereby in the secondary winding 332.

The low frequency signals which have now been limited to a predetermined maximum amplitude are applied through condenser 335 to grid 337 of tube 339 simultaneously with the medium frequency signals from the anode circuit of tube 314, the tubes, and windings of transformer 334, being arranged so that the low and medium frequency signals are recombined in proper phase relationship.

*Recombining of low and medium frequencies with high frequencies*

A direct current return is provided for grid 337 by a resistor 454. Cathode 456 of tube 339 is connected to ground through a bias resistor 458. Anode 462 of this tube is connected through resistor 464, lead 148 and (see Fig. 6) load resistor 466 to the power source B. The low and medium frequency components are recombined at point 152 with the high frequency components of the signal to form the composite audio signal. Thus, the frequency components, which have been separated, subjected to selective limiter action in proper phase relationship, are passed through amplifier 144 to the recorder head 158.

*Volume level indicator*

In order to provide a visual indication of the recording level of the system, a meter 468 (Fig. 6A) is provided. A protective resistance 472 is connected across the terminals of the meter, one of which is connected to ground by a lead 474. The other terminal of the meter is connected through a condenser 476, an isolating resistor 478, and lead 482 to the anode circuit of tube 384 in the low and medium frequency limiter control circuit. The same terminal of the meter is connected also through lead 238 (see Fig. 6), resistor 236, and condenser 234 to the anode circuit of tube 222 in the high frequency limiter control circuit.

Approximate values of the components which may be used in the above circuits are given in the following table.

*Tubes*

| Number | Type |
|---|---|
| 64 | 6SJ7. |
| 114 | 6SA7. |
| 222 | 6SN7 (½). |
| 248 | 6H6. |
| 282 | 6SJ7. |
| 314 | 6SL7GT (½). |
| 332 | 6SL7GT (½). |
| 346 | 6SA7. |
| 384 | 6SN7 (½). |
| 404 | 6H6. |
| 432 | 6SA7. |

*Resistance elements*

| Number | Value in thousands of ohms | Number | Value in thousands of ohms |
|---|---|---|---|
| 56 | 100. | 298 | 10. |
| 74 | 0.75 | 302 | 0.680 |
| 84 | 10. | 306 | 0.680 |
| 86 | 0.680 | 318 | 3.3 |
| 94 | 0.680 | 324 | 100. |
| 96 | 100. | 326 | 10. |
| 122 | 0.220 | 342 | 470. |
| 134 | 24. | 354 | 0.22 |
| 138 | 22. | 378 | 1,000. |
| 176 | 10. | 388 | 1. |
| 188 | 56. | 396 | 15. |
| 192 | 10. | 406 | 47. |
| 194 | 15. | 408 | 10. |
| 196 | 20. | 414 | 47. |
| 226 | 1. | 418 | 470. |
| 236 | 20. | 428 | 47. |
| 242 | 15. | 438 | 0.22 |
| 252 | 47. | 454 | 470. |
| 254 | 10. | 458 | 2.2 |
| 264 | 470. | 464 | 100. |
| 266 | 47. | 466 | 4.7 |
| 284 | 470. | 472 | 3.6 |
| 292 | 0.750 | 478 | 20. |

*Capacitance elements*

| Number | Value in Microfarads | Number | Value in Microfarads |
|---|---|---|---|
| 92 | 0.01 | 304 | 0.05 |
| 136 | 0.01 | 326 | 0.02 |
| 162 | 0.02 | 338 | 0.02 |
| 234 | 0.03 | 376 | 0.01 |
| 244 | 0.5 | 398 | 2.0 |
| 268 | 0.5 | 424 | 0.5 |
| 272 | 0.1 | 426 | 0.1 |
| 276 | 0.02 | 476 | 0.5 |

Although actual detailed circuits have been provided together with typical values of the components, it is to be understood that this example is given, in accordance with the statutory requirements, for the purpose of exemplifying a now preferred embodiment, and that the invention is not intended to be limited thereby.

Figure 7:
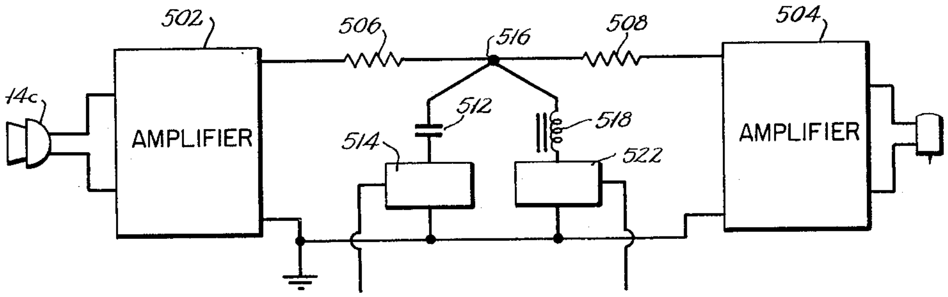
Fig. 7 shows alternative apparatus for selective limitation of the sound signals.

For example, the selective limiting action may be accomplished in the manner indicated in Fig. 7. The electrical signals are delivered by a microphone 14C to a conventional amplifier 502 indicated in block form. The output from this amplifier is coupled to a second amplifier 504 through series resistors 506 and 508. A frequency selective circuit comprising a condenser 512 in series with a variable impedance generator 514, indicated in block form, is connected between point 516 and ground. The value of condenser 512 is selected so that its reactance relative to the value of resistor 506 is low at the higher frequencies, and is relatively high at the lower frequencies. The amount by which the high frequency components are attenuated by voltage drop across resistor 506, therefore, is a function of the impedance presented by impedance generator 514. Such an impedance generator, if controlled in accordance with the present invention, may be utilized to provide the selective limitation of the high frequency components.

In order to limit selectively the lower frequencies, an inductance 518 is connected from point 516 to ground through an impedance generator 522, indicated in block diagram form. By controlling the value of the impedance presented by generator 522, in accordance with the principles of the present invention, the low frequency components of the signal may be limited selectively.

Figure 8:
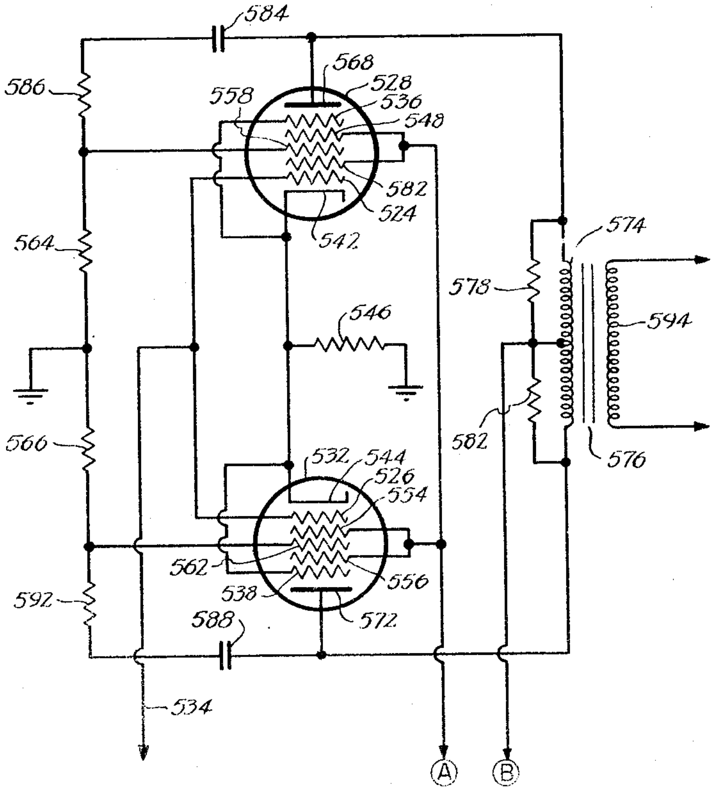
Fig. 8 shows the circuit diagram of a variable impedance generator suitable for use in the apparatus of Fig. 7.

Fig. 8 is a circuit diagram of an impedance generator suitable for use as the blocks 514 and 522 in the system shown in Fig. 7. The desired limiter control voltage is applied simultaneously to control grids 524 and 526 of tubes 528 and 532, respectively, by means of a lead 534. The suppressor grids 536 and 538 of these tubes are connected to their respective cathodes 542 and 544 which are returned to ground through a common bias resistor 546. The grids 548 and 552 of tube 528, and grids 554 and 556 of tube 532, are connected to power source A. Control grid 558 of tube 528 and the corresponding control grid 562 of tube 532 are returned to ground respectively through grid return resistors 564 and 566. The anodes 568 and 572 of tubes 528 and 532, respectively, are connected to opposite ends of primary winding 574 of a transformer 576 the center tap of which is connected to power source B. A resistor 578 is connected in shunt with one-half of winding 574 and a resistor 582 is in shunt with the other half of this winding. Negative feedback voltage is applied from anode 568 to grid 558 of tube 528 by means of a condenser 584 and a series resistance 586. In a similar manner anode 572 of tube 532 is coupled to grid 562 through a condenser 588 and a resistor 592.

In operation, when an alternating current signal is applied to winding 594 of transformer 576, a voltage is induced in winding 574 which is applied simultaneously, but with opposite polarity, through condensers 584 and 534 to grids 558 and 562 of tubes 528 and 532 respectively. The applied signal produces current flow through these tubes and through winding 574 of the transformer. This loading effect decreases the impedance of winding 594 to the alternating current signals. However, the amount by which this impedance is reduced depends upon the transconductances of tubes 528 and 532, which have substantially identical characteristics. The transconductance of these tubes is a function of the control voltage applied to the control grids 524 and 526. The alternating current impedance presented by winding 594 may be varied accordingly by application of direct control voltage to lead 534. This arrangement provides wide variation in the impedance of 594 which is substantially resistive in character.

It is obvious that the structures for carrying out the present invention may vary widely from the illustrative embodiments presented herewith without departing from the scope of the invention. For example, the signal which is utilized to control the limiting action of the low frequency limiter is derived from a particular point in the circuit where low and medium frequencies are present only for convenience, and readily could be taken from some other point in the circuit. For example, this control signal could be derived directly from the input signal from the microphone after suitable amplification. Other circuit modifications are within the province of one skilled in the art who may modify and vary the suggested arrangements to best suit his particular recording requirements.

In addition, it is to be noted that the time constants of the circuits are of importance and will be adjusted in accordance with the requirements of the particular system; those controlling the limiting action being selected, in most applications, so that no audible signal results from the action of the limiter.

The interpretation to be applied to the relative terms, low frequencies, medium frequencies and high frequencies, will depend upon the particular frequency range which is being handled by the system. In the conventional sound recording system in which music is being recorded for entertainment purposes, the frequency ranges may be defined as follows: low frequencies are those below 400 cycles per second, medium or middle range frequencies extend from 400 to 1500 cycles per second, and high frequencies are those above 1500 cycles per second. It is obvious that these are not inflexible or critical limitations and may be varied to considerable extent even in conventional music recording systems, and that widely different values may be selected depending upon the recording system and the type of material being recorded.

Moreover, it is apparent that the invention may be applied or utilized in various ways. For example, the present application of the invention provides for a higher volume of sound level with a given groove width, it is obvious that the advantage may be taken by reducing the groove width, utilizing the present invention to maintain a desired volume level and, thus, securing a longer recording time by virtue of the increased number of grooves.

I claim:

1. Apparatus for producing a variable impedance to alternating current and in which the magnitude of said impedance varies in accordance with variations in an applied direct control voltage, said apparatus comprising a transformer having a first and a second winding, a first and a second vacuum tube each having an anode, first and second control electrodes, and an electron emitting element, a circuit connecting said anode of said first tube with one end of said second winding and said anode of said second tube with the opposite end of said second winding, a feedback circuit between said anode of said first tube and said first control electrode thereof, a feedback circuit between said anode of said second tube and said first control electrode thereof, and a circuit connecting together said second control electrodes of said first and second tubes, an external source of direct control voltage connected to said last said circuit whereby the alternating current impedance of said first winding is caused to vary in accordance with the magnitude of said direct control voltage.

2. Apparatus for producing a variable impedance to alternating current and in which the magnitude of said impedance varies in accordance with variations in an applied control voltage, said apparatus comprising a source of voltage, a transformer having a first and a second winding, said second winding having a connection at each end and substantially at the center thereof, a first and a second vacuum tube each having an anode, primary and secondary control electrodes, and an electron emitting element, each of said tubes being coupled to said source of voltage, a circuit connecting said anode of said first tube wtih one end of said second winding and said anode of said second tube with the opposite end of said second winding, a first and a second negative feed-back circuit coupled respectively to said secondary electrodes of said first and second tubes, and a circuit connected to said primary control electrode of said first tube and said primary control electrode of said second tube for applying a control voltage with like polarity to said electrodes, whereby the alternating current impedance of said first winding is caused to vary in accordance with the magnitude of said control voltage.

3. A sound recording system comprising a record medium, a recorder head, a signal input channel, first, second, and third auxiliary channels, at least one dividing network coupling said input channel to each of said auxiliary channels so that said first channel carries predominantly low frequency components, said second channel carries predominantly middle frequency components, and said third channel carries predominantly high frequency components, an electrical circuit for re-combining signals from said first, second, and third channels and feeding them to said recorder head, first, second, and third amplifiers included in said first, second, and third auxiliary channels, respectively, means for varying the gain of said first amplifier in accordance with the variation in amplitude of the low frequency components of said signal, and means for varying the gain of said third amplifier in accordance with the variation in total voltage applied to said recorder head.

4. A sound recording system comprising a record, a recorder head in contact with said record, driving means for rotating said record relative to said recorder head, a signal input channel, first, second, and third auxiliary channels, at least one dividing network coupling said input channel to each of said auxiliary channels so that said first channel carries predominantly low frequency components, said second channel carries predominantly middle frequency components, and said third channel carries predominantly high frequency components, an electrical circuit for re-combining signals from said first, second, and third channels and feeding them to said recorder head, first, second, and third amplifiers included in said first, second, and third channels, respectively, means for varying the gain of said first amplifier in accordance with the variation in amplitude of the low frequency components of said signal, means for modifying the gain of said third amplifier in accordance with the variation in total voltage applied to said recorder head, and means for further modifying the degree of effect of said total voltage on the gain of said third amplifier in accordance with the speed of said record medium relative to said recorder head at the point of contact.

5. A sound recording system comprising a record, a recorder head, means for rotating said record and moving said recorder head transversely thereof so as to incribe a spiral sound groove thereon, a signal input channel, first second, and third auxiliary channels, at least one dividing network coupling said input channel to each of said auxiliary channels so that said first channel carries predominantly low frequency components, said second channel carries predominantly middle frequency components, and said third channel carries predominantly high frequency components, an electrical circuit for re-combining signals from said first, second, and third channels and feeding them to said recorder head, first, second, and third amplifiers included in said first, second, and third channels, respectively, said first and third amplifiers each having a control element for varying the gain thereof in accordance with the value of a D.-C. control signal, means for applying a first D.-C. control signal to said first amplifier to vary the gain thereof in accordance with the variation in amplitude of the low frequency components of said signal, a voltage-generating circuit coupled to the output of said re-combining circuit for producing a second D.-C. control signal having a magnitude proportional to the total signal voltage delivered to said recorder head as a result of said re-combined signal, a coupling circuit for coupling said second control signal to said control element of said third amplifier, an adjustable attenuator included in said coupling circuit, and a mechanism for adjusting said attenuator in accordance with the radial position of said recorder head relative to said record.

EMORY G. COOK.

REFERENCES CITED

The following references are of record in the file of this patent:

UNITED STATES PATENTS

| Number | Name | Date |
|---|---|---|
| 2,008,708 | Hammond | July 23, 1935 |
| 2,096,760 | Purington | Oct. 26, 1937 |
| 2,122,193 | Bedford | June 28, 1938 |
| 2,118,602 | Goldsmith | May 24, 1938 |
| 2,173,222 | Belar | Sept. 19, 1939 |
| 2,239,042 | Kleber | Apr. 22, 1941 |
| 2,340,364 | Bedford | Feb. 1, 1944 |
| 2,369,088 | Thompson | Feb. 6, 1945 |
| 2,371,285 | Crosby | Mar. 13, 1945 |
| 2,395,159 | Albin | Feb. 19, 1946 |
| 2,528,457 | Stone | Oct. 31, 1950 |